(12) United States Patent
Michael et al.

(10) Patent No.: US 7,282,236 B2
(45) Date of Patent: Oct. 16, 2007

(54) HYDROPHOBIC SILICA

(75) Inventors: Günther Michael, Karlstein (DE); Volker Kasack, Niedergründau (DE); Rüdiger Nowak, Kahl/Main (DE)

(73) Assignee: Degussa GmbH (DE)

( * ) Notice: Subject to any disclaimer, the term of this patent is extended or adjusted under 35 U.S.C. 154(b) by 181 days.

(21) Appl. No.: 10/623,051

(22) Filed: Jul. 18, 2003

(65) Prior Publication Data

US 2004/0024070 A1 Feb. 5, 2004

Related U.S. Application Data

(63) Continuation of application No. 09/740,039, filed on Dec. 20, 2000, now abandoned.

(60) Provisional application No. 60/171,667, filed on Dec. 27, 1999.

(30) Foreign Application Priority Data

Dec. 22, 1999  (DE) ................................ 199 61 933

(51) Int. Cl.
*B01J 2/30* (2006.01)
*C01B 33/145* (2006.01)
*C01B 33/159* (2006.01)

(52) U.S. Cl. .................. 427/220; 428/405; 252/363.5; 516/100

(58) Field of Classification Search ................ 516/100, 516/111; 428/405; 427/220; 252/363.5
See application file for complete search history.

(56) References Cited

U.S. PATENT DOCUMENTS

| | | | | |
|---|---|---|---|---|
| 3,860,682 A | * | 1/1975 | Reinhardt et al. ........... 264/518 |
| 3,931,036 A | | 1/1976 | Pierce ........................ 510/531 |
| 4,307,023 A | * | 12/1981 | Ettlinger et al. ............ 524/268 |
| 4,326,852 A | * | 4/1982 | Kratel et al. ............... 23/293 R |
| 4,680,173 A | | 7/1987 | Burger ........................ 424/47 |
| 4,877,595 A | | 10/1989 | Klingle et al. .............. 423/335 |
| 5,057,151 A | * | 10/1991 | Schuster et al. ............ 428/405 |
| 5,429,873 A | | 7/1995 | Deusser et al. ............. 428/405 |
| 5,686,054 A | | 11/1997 | Barthel et al. .............. 423/335 |
| 5,959,005 A | | 9/1999 | Hartmann et al. .......... 523/213 |
| 6,124,392 A | | 9/2000 | Heisler et al. .............. 524/492 |
| 6,193,795 B1 | | 2/2001 | Nargiello et al. ........... 106/484 |
| 6,316,050 B1 | | 11/2001 | Troll et al. ................. 427/220 |

FOREIGN PATENT DOCUMENTS

| | | |
|---|---|---|
| EP | 0 010 655 | 5/1980 |
| EP | 0 280 851 | 9/1988 |
| EP | 0 808 880 A2 | 11/1997 |
| GB | 2 225 570 | 6/1990 |
| JP | 55-51714 | 4/1980 |
| JP | 63-054485 | 3/1988 |
| JP | 63-209715 | 8/1988 |
| JP | 6-087609 | 3/1994 |
| JP | 06-087609 * | 3/1994 |
| JP | 6-503048 | 4/1994 |
| JP | 2000-256008 A | 9/2000 |
| WO | WO92/13694 | 8/1992 |

OTHER PUBLICATIONS

Machine Translation of JP 06-87609, Obtained from Japan Patent Office, http://www19.ipdl.ncipi.go.jp/PA1/cgi-bin/PA1INDEX , (Sep. 2005), pp. 1-6, Abstract, Claims, & Detailed Description.*
Official Action, dated Aug. 9, 2000, issued by the German Patent Office, for German Patent Application No. 199 61 933.6 (2 pages).
Official Action, dated Aug. 25, 2003, issued by the British Patent Office, for British Patent Application No. GB 0030863.5 (1 page).
Office Action, dated Mar. 23, 2001, issued by the British Patent Office, for British Patent Application No. GB 0030863.5 (2 pages).

* cited by examiner

*Primary Examiner*—Daniel S. Metzmaier
(74) *Attorney, Agent, or Firm*—Robert G. Weilacher; Smith, Gambrell & Russell, LLP

(57) ABSTRACT

Methods of making hydrophobic, pyrogenically produced silica having a tamped density, of 55 to 200 g/l. Said silica is produced by hydrophobizing pyrogenically produced silica by reaction with a halogen free silane and then compacting it with means consisting of a roller compactor or a belt filter press. The silica may be used for the production of dispersions.

1 Claim, No Drawings

HYDROPHOBIC SILICA

REFERENCE TO RELATED APPLICATIONS

This application is a continuation of application Ser. No. 09/740,039 filed Dec. 20, 2000, now abandoned, which claims the benefit of provisional application 60/171,667 filed Dec. 27, 1999, both of which are relied on and incorporated herein by reference.

INTRODUCTION AND BACKGROUND

This invention relates to a hydrophobic, pyrogenically produced silica, to a process for the production thereof and to the use thereof.

It is known to compact hydrophilic, pyrogenically produced silica (EP0 280 851 B1). Disadvantageously, as tamped or bulk density increases, thickening action declines in a linear manner. Dispersibility also falls as density increases. This results in unwanted speckling. Thus, once compacted, a hydrophilic, pyrogenically produced silica may only be used for a limited number of applications.

It is therefore an object of the present invention to avoid the problems of compacted, hydrophobic, pyrogenically produced silica of the past.

SUMMARY OF THE INVENTION

The above and other objects of the present invention can be achieved by developing a hydrophobic, pyrogenically produced silica having a tamped density of 55 to 200 g/l.

The tamped density is preferably from 60 to 200 g/l.

A feature of the present invention is a process for the production of the hydrophobic, pyrogenically produced silica having a bulk density of 55 to 200 g/l, which process is characterised in that pyrogenically produced silica is hydrophobized using known methods and then compacted.

Hydrophobing can preferably be performed by means of halogen-free silanes. The chloride content of the silica can be less than or equal to 100 ppm, preferably from 10 to 100 ppm.

Compaction can be performed by means of a roller compactor. Compaction can preferably be performed by means of a belt filter press according to EP 0 280 851 B1, which reference is relied on and incorporated by reference.

The hydrophobic, pyrogenically produced silica used for purposes of the present invention can be, for example, the silicas known as:

Aerosil R 812 or Aerosil R 8128, having the group —O—Si(CH$_3$)$_3$

Aerosil R 202, Aerosil MS 202, Aerosil MS 202, Aerosil R 106 or Aerosil R 104 having the group

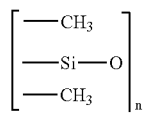

Aerosil R 805 having the group

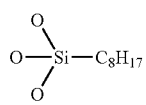

These are commercially available products from Degussa Hüls AG.

The hydrophobic, pyrogenic silica according to the invention having a tamped density of 55 to 200 g/l exhibits the following advantages:

Transport costs are distinctly lower as a result of the higher tamped density.

Once dispersed, the silica according to the invention is in the form of relatively small aggregates. In other words, the dispersions are more finely divided because the silica according to the invention is more readily dispersible.

The dispersions produced using the silica according to the invention exhibit a lower Grindometer value.

Both UV transmission transparency and visual transparency of the dispersions are distinctly improved by using the silica according to the invention.

Dispersions containing the silicas according to the invention exhibit distinctly increased stability because the tendency towards settling is distinctly lower.

Another advantage of the silica according to the invention is reduced dusting during incorporation and the distinctly reduced incorporation or wetting time in, for example, liquid systems.

In comparison with hydrophobic, pyrogenic silica of a lower bulk density, the hydrophobicity of the silica according to the invention is unchanged. Thickening action is also unchanged.

DETAILED DESCRIPTION OF THE INVENTION

The present invention will be further understood with reference to the following detailed embodiments thereof.

EXAMPLE 1

Various hydrophobic, pyrogenically produced silicas are investigated, wherein different compaction states are compared.

The following definitions apply:

| | |
|---|---|
| bulk = | pulverulent, unmodified silica |
| CF = | silica compacted with a Carter filter |
| VV 60 = | silica compacted to a tamped density of approx. 60 g/l |
| VV 90 = | silica compacted to a tamped density of approx. 90 g/l |

Aerosil grades R 202, US 202, US 204, R 812, R 812S and R 805 are investigated. The results are shown in Table 1.

As evaluated by the Corning Glass methanol wettability method, the degree of compaction has virtually no appreciable influence on hydrophobicity. Viscosity also exhibits no clear systematic dependency upon tamped density. Especially for R 812, dispersibility improves with increasing density. R 812S, which contains more SiOH groups than R 812, exhibits the above phenomenon less markedly.

US 202 and US 204 have very comparable theological properties and are inferior to AEROSIL R 202.

Surprisingly, the compacted variants, in particular of R 812, R 202 and US 202/4, exhibit an incorporation time reduced by up to half. The compacted silicas moreover exhibit reduced dusting.

| PA | Test method | 444701 AER 202 CF | 444702 AER 202 CF | 444703 AER 202 VV60 | 444704 AER 202 VV90 | 444705 AER 805 bulk | 444706 AER 805 CF | 444707 AER 805 VV60 | 444708 AER 805 VV90 | 444709 AER812 bulk | 444710 AER812 CF | 444711 AER812 VV60 |
|---|---|---|---|---|---|---|---|---|---|---|---|---|
| 0330 | Viscosity, epoxy before cure | 459 | 456 | 382 | 430 | 190 | 181 | 185 | 178 | | | |
| 0335 | Viscosity, epoxy after cure | 54.4 | 54.7 | 49.4 | 52.8 | 42 | 41.7 | 39 | 43 | | | |
| 0340 | Thickening action | | | | | | | | | 11.7 | 13.3 | 11.5 |
| 0410 | Grind motor value | | | | | | | | | 127 | 102 | 92 |
| 0420 | Methanol wetability | | | | | | | | | | | |
| 0701 | Tamped density | 45 | 50 | 51 | 75 | 44 | 62 | 55 | 68 | 45 | 44 | 50 |
| 0920 | Agglemerate strength | | 11 | 20 | 18 | | 15 | 15 | 20 | | | |
| 0930 | Hand: |sic|sieve oversize | 0 | 24 | 4 | 27 | 0 | 36 | 7 | 19 | 0 | 0 | |
| 0955 | Effectiveness | 258 | 274 | 203 | 266 | 235 | 260 | 236 | 258 | 166 | 185 | 169 |
| 0965 | Effectiveness(UT) | 280 | 290 | 226 | 295 | 271 | 281 | 270 | 288 | 197 | 213 | 209 |
| 0975 | Settling(effectiveness) | 15 | 15 | 15 | 8 | 10 | 15 | 10 | 5 | 13 | 15 | 8 |

| PA | Test method | 444712 AER 812 VV90 | 444713 AER 812S bulk | 444714 AER 812S CF | 444715 AER 812S VV60 | 444716 AER 812S VV90 | 444717 US202 bulk | 444718 US202 CF | 444719 US202 VV60 | 444720 US204 bulk | 444721 US204 CF | 444722 US204 VV60 | 444723 US204 VV90 |
|---|---|---|---|---|---|---|---|---|---|---|---|---|---|
| 0330 | Viscosity, epoxy before cure | | | | | | 350.4 | 377.6 | 380.8 | 379.2 | 350.4 | 358.4 | 368 |
| 0335 | Viscosity, epoxy after cure | | | | | | 50.7 | 45.9 | 45.3 | 49.9 | 47 | 52.6 | 50.7 |
| 0340 | Thickening action | 11.1 | 17.3 | 17.3 | 18.2 | 17 | | | | | | | |
| 0410 | Grind motor value | 77 | 93 | 110 | 110 | 100 | | | | | | | |
| 0420 | Methanol wetability | | | | | | | | | | | | |
| 0701 | Tamped density | 73 | 49 | 50 | 58 | 75 | 39 | 50 | 67 | 44 | 45 | 57 | 71 |
| 0920 | Agglemerate strength | 22 | | | | 28 | | 10 | 15 | | | 16 | 23 |
| 0930 | Hand: |sic|sieve oversize | 12 | 0 | 0 | 0 | 4 | 0 | 27 | 36 | 0 | 0 | 3 | 20 |
| 0955 | Effectiveness | 159 | 168 | 169 | 187 | 209 | 320 | 304 | 320 | 186 | 193 | 192 | 201 |
| 0965 | Effectiveness(UT) | 225 | 201 | 200 | 216 | 235 | 336 | 327 | 346 | 223 | 225 | 225 | 230 |
| 0975 | Settling(effectiveness) | 5 | 8 | 8 | 3 | 0 | 15 | 10 | 3 | 10 | 10 | 10 | 10 |

EXAMPLE 2

Investigation of the Influence of Higher Compaction on Applicational Properties

|  |  | AE R 812, uncompacted UB 3847-1 10 kg sack | AE R 812, compacted RHE UB 3847-2 (4) 15 kg sack | AE R 812, compacted RHE UB 3847-3 (5) 20 kg sack | AE R 812 RHE specific. |
|---|---|---|---|---|---|
| Tamped density (DIN ISO 787/11) | g/l | 50 | 87 | 106 | approx. 50 |
| Effectiveness, ethanol (0955) |  | 184 | 214 | 209 | 216 1) |
| Effectiveness (UT), ethanol (0965) |  | 218 | 260 | 290 | 236 1) |
| Settling (effectiveness, high-speed mixer) | vol. % | 10 | 1 | 1 | 1) |

1. Determined on standard sample (UB 3391)

RHE in the above table indicates the Rheinfelden plant located in Germany.

Rheological Testing:

Polymer: Araldit M (biphenol-1-expoxy resin by Ciba-Geogy, in the form of clear yellow liquid).

Thixotroping agent: R 202 and R 812 Additive:—

| Sample production date: 24 Feb. 1994 Spindle: 5 | | | |
|---|---|---|---|
| Storage time in days | 5 rpm [mPa*s] | 50 rpm (mPa*s) | T.I. |
| Sample A R 812 10 kg 2-10123 | | | |
| 0 | 16600 80-85 μ | 4460 | 3.72 |
| Sample A R 812 15 kg 1.0/8 min | | | |
| 0 | 15100 50-60 μ | 4060 | 3.72 |
| Sample AR 812 20 kg 0.6/14 min | | | |
| 0 | 15100 50-60 μ | 4020 | 3.73 |

Compaction may amount to a type of predispersion. Accordingly, effectiveness values rise with tamped density, i.e. the particles effectively present in the ethanol dispersion become smaller and the compacted samples exhibit distinctly less settling. Any suitable organic solvent can be used to form the dispersion.

The compacted samples accordingly have a more favourable Grindometer value in Araldit. However, since the larger particles have a decisive influence on thickening action, the property declines slightly on compaction.

It may be seen from the effectiveness values that, while the highly compacted AEROSIL R 812 sample may indeed still be broken up with the Ultra-Turax® mixer(0965), it can no longer be broken up with the high speed mixer (0955). Due to the smaller surface area of AEROSIL R 202 (and to the consequently theoretically improved dispersibility), this phenomenon hardly occurs with AEROSIL R 202. The parenthetical values (0965) and (0955) are the PA numbers in the tables on pages 5 and 6.

As compaction rises, the particles effectively present in an ethanol dispersion thus become smaller and 90° angle scattering rises due to Rayleigh scattering. Total scattering (over all angles), however, falls and the samples become distinctly more transparent on visual inspection, as is also substantiated by the UV transmission spectra.

Compaction has no influence on hydrophobicity, which in each case substantially corresponds to that of the standard sample.

EXAMPLE 3

Investigation of the Influence of Higher Compaction on Applicational Properties.

|  |  | AE R 812, uncompacted UB 3848-1 2-02024 10 kg sack | AE R 202, compacted RHE UB 3848-2 2-01024- (2) 15 kg sack | AE R 202, compacted RHE UB 3848-3 2-01024- (3) 20 kg sack | AE R 202 RHE specific. |
|---|---|---|---|---|---|
| Tamped density (DIN ISO 787/11) | g/l | 51 | 93 | 119 | approx. 60 3) |
| Effectiveness, ethanol (0955) |  | 319 | 334 | 336 | 334 1) |
| Effectiveness (UT), ethanol (0965) |  | 346 | 365 | 373 | 339 1) |
| Settling (effectiveness, high-speed mixer) | vol. % | 10 | 5 | 1 |  |

1) Determined on standard sample (UB 3391)
3) Guide value

The compacted AEROSIL R 202 samples behave in a similar manner to the compacted AEROSIL R 812 samples.

Reference is thus made to Example 2 with regard to the discussion.

The parameter of "effectiveness" reported in the tables herein relates to the high degree of fineness of the particle. This is therefore an indicator of high transparency and good stability of the resulting dispersions.

Further variations and modifications of the foregoing will be apparent to those skilled in the art and are intended to be encompassed by the claims appended hereto.

German priority application filed Dec. 22, 2000 199 61 933.6 is relied on and incorporated herein by reference.

The invention claimed is:

1. A process for the production of the finely divided, readily dispersible hydrophobic, pyrogenically produced silica in the form of aggregates having a tamped density of 55 to 200 g/l comprising hydrophobizing pyrogenically produced silica by reaction with a halogen-free silane and then compacting said silica with means consisting of a roller compactor or a belt filter press.

* * * * *